Nov. 30, 1948.   R. L. STARKEY ET AL   2,454,952
MEASUREMENT OF CORROSIVE CHARACTERISTICS OF THE SOIL
Filed April 12, 1946
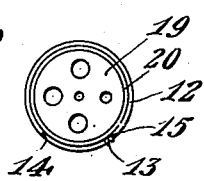
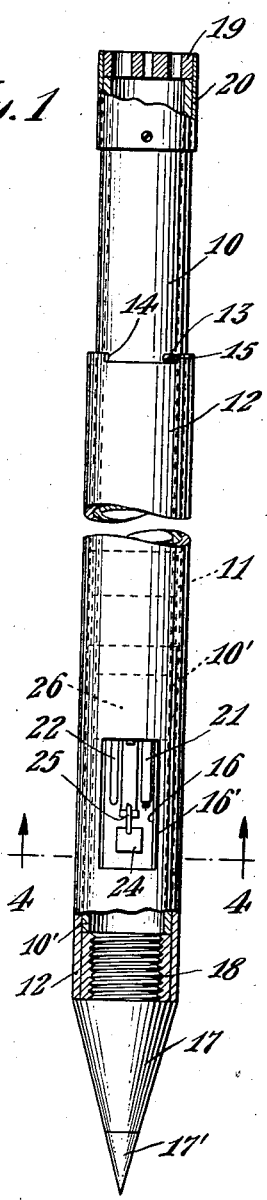
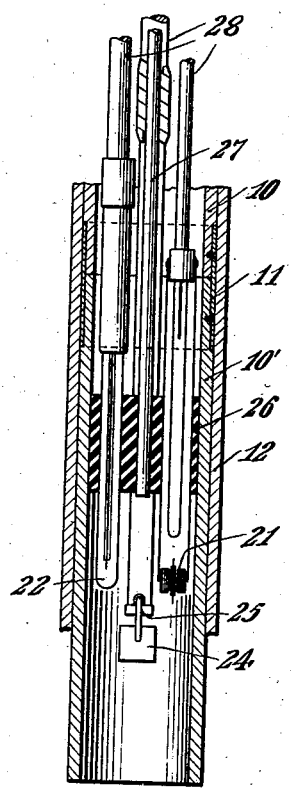
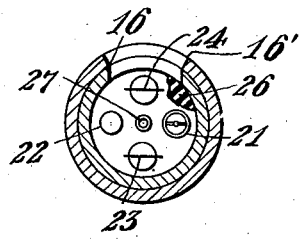
INVENTORS
ROBERT L. STARKEY
KENT M. WIGHT
BY
Ward, Crosby & Neal
ATTORNEYS Patented Nov. 30, 1948

2,454,952

UNITED STATES PATENT OFFICE 2,454,952

MEASUREMENT OF CORROSIVE CHARACTERISTICS OF THE SOIL

Robert L. Starkey, New Brunswick, N. J., and Kent M. Wight, Philadelphia, Pa., assignors to American Gas Association, Inc., New York, N. Y., a non-profit membership corporation of the State of New York Application April 12, 1946, Serial No. 661,566

1 Claim. (Cl. 204—195)

This invention relates to methods and apparatus for testing soils in situ, as located in subsurface positions, to measure the hydrogen ion concentration (pH) therein, and also at the same time to measure the oxidation-reduction potentials ($E_h$) thereof, and whereby the pH of the soil at the time of the measurement of the $E_h$ value will be made known, thus enabling the $E_h$ measurement to be corrected as of any desired predetermined pH.

The invention is particularly applicable to the testing of soils to detect the presence of conditions favorable to anaerobic activity and, more specifically, conditions which will cause anaerobic corrosion of metals such as iron.

In the laying of pipe lines and the maintenance thereof, for example, it is important to be able to inexpensively and rapidly test the soil from point to point along the right-of-way so that if conditions are favorable to corrosive action, suitable steps may be taken to protect the surface of the pipe before it is laid, or afterwards in the event corrosive conditions become evident. It has been found that corrosion arising from the activity of anaerobic bacteria is a serious cause of damage to pipe lines. Such corrosion is believed to be largely due to the ability of such bacteria to reduce sulphate under anaerobic conditions in the soil, the sulphate in the process becoming an hydrogen acceptor and being reduced to sulphide. Thus hydrogen which is present on cathodic areas of the iron in the soil, is removed with consequent depolarization, and the formation of iron sulphide and hydroxide.

While a complication of factors may be involved in creating conditions favorable to the growth of anaerobic bacteria in the soil and to such corrosion of any iron present, it has been found that in general soils conducive to growth of such bacteria have a pH ranging from a minimum of about 5.5 up to a maximum of about 8.5. Also it has been found that not all soils within such range are favorable to anaerobic bacteria, but only those which have an oxidation-reduction intensity ($E_h$) within a certain range. Thus, by accurate measurement of the pH and $E_h$ values of the soil, it is possible generally to detect the presence of conditions which will be conducive to anaerobic corrosion.

But heretofore, so far as is known, no methods or apparatus have been available for affording accurate measurement of these values for purposes such as above referred to. If samples of the soil are removed from their sub-surface positions and then tested for their pH and $E_h$ values, the results obtained, particularly as to the $E_h$ value, may often be highly inaccurate for indicating the condition of the soil before its removal from its concealed subsurface position. Both the pH and $E_h$ values may be radically modified because of substantial exposure of the soil samples to the oxygen of the atmosphere, or because of evaporation therefrom.

In accordance with the present invention a method and apparatus is provided, enabling rapid and inexpensive testing of the soils in situ as located at various points in sub-surface positions. To this end there is provided in accordance with the invention, a soil probe adapted to be pushed into the earth to the depth of the soils to be tested, this device having within its lower end a plurality of electrodes of the general types heretofore known for laboratory measurements of pH and $E_h$ values. In the preferred form of the device, its lower end is normally closed as pushed into the earth, and means accessible from its upper end is provided for opening the electrode enclosure near the lower end, after the device has been pushed into the earth, to permit the soil to enter and surround the electrodes. Wires may be provided extending up through the device for connection to potential measuring apparatus, to permit convenient and rapid measurement of the potentials representative of the pH and $E_h$ values, while the probe remains in place. Thus both of these values may be substantially concurrently measured in a single sample of soil while the latter remains substantially in situ and under its natural conditions, protected against access of the atmosphere and against escape of vapor or gases therefrom. Since the measurements may be completed within a few minutes after the probe is introduced into the sub-surface soil sample, any slight disturbance of the natural conditions by the probe, will not have any modifying effect on the readings.

The use of electrodes for measuring both the pH and $E_h$ values in a single unitary structure enables an $E_h$ reading to be obtained from the same soil sample at substantially the same time that the pH reading is obtained and accordingly, the $E_h$ reading may be accurately corrected to any desired predetermined pH. Thus, for example, in using the device for detecting conditions favorable to anaerobic corrosion, the $E_h$ readings obtained may be conveniently corrected to the neutral point (pH of 7) which is also convenient as being half way between the maximum and minimum pH limits within which anaerobic bacteria will grow. If the pH reading obtained is within the limits of 5.5 and 8.5 and if the $E_h$ reading as corrected is within a range, found by experience to be favorable to such bacteria, it can be assumed that conditions favorable to anaerobic corrosion exist and that steps should be taken to protect any iron installed in such soil.

Various further and more specific objects, features and advantages of the invention will appear from the detailed description given below taken in connection with the accompanying drawings which form a part of this specification and illustrate by way of example, a preferred form of the invention. The invention consists in such novel features, combinations of parts, methods and method steps as may be shown and described in connection with the apparatus herein disclosed.

In the drawings:

Fig. 1 is a side elevational view of a preferred form of soil probe embodying the invention;

Fig. 2 is a top end view thereof;

Fig. 3 is an enlarged sectional view of the portion thereof within which the electrodes are carried; and Fig. 4 is a sectional view taken substantially along the line 4—4 of Fig. 1.

As shown in the drawings, the device may comprise an inner cylindrical tube as at 10 formed of suitable insulation plastic material, preferably laminated with fabric. At its lower end this tube may have a detachable portion 10' within which the electrodes are carried as hereinafter explained. Portion 10' may be secured to portion 10 as by a metal collar 11 into which the abutting ends of portions 10 and 10' may be slid and retained by any suitable means such as pins or screws. Tube 10 may be surrounded by an outer tube 12 of like or similar insulation material, the outer tube being rotatable about the inner tube to an extent limited by a stop screw or pin 13 fixed in tube 10 at a point adjacent the upper end of the outer tube 12, a portion of the upper edge of the latter being cut away to provide stops as at 14, 15, which are engaged by the pin 13 to limit the rotational movement.

The tube extension 10' as well as the outer tube 12 near its lower end, are formed with openings or windows 16, 16' the outlines of which coincide when stop pin 13 is in engagement with stop 15. Thus, with the outer tube in this position, there is an opening provided into the electrode cavity. However, when the outer tube is rotated to a position with the stop pin in engagement with the stop 14, then the window opening 16' will be out of register with the opening 16, so that the latter will be closed.

The lower end of the device is preferably equipped with suitable pointed means to facilitate pushing the device into the soil to the desired depth. For example, such pointed means may comprise a conical member 17 formed of metal such as aluminum or a suitable aluminum alloy and having if desired a tip 17' of harder metal. The cone 17 may be attached within the lower end of tube 12, as by a threaded metal ring 18 set within the end of the tube. The tube 12 together with the pointed member 17 may be slid downwardly off the inner tube to afford access to the electrode cavity for cleaning, etc., after the device has been used.

The upper end of the tube 10 may be covered by a suitable disc of plastic material as at 19 formed with apertures for the entrance of lead wires as hereinafter referred to. This disc may be held in place as by a metal collar member 20.

As shown in Figs. 3 and 4, four electrodes 21—24 inclusive are preferably provided within tube extension 10' at a position opposite the window 16. Electrode 21 comprises a so-called "calomel half cell" of a suitable known type, such as heretofore used in connection with apparatus for measuring pH values. Electrode 22 may comprise a glass membrane type of electrode of small diameter, for example a Beckman electrode such as heretofore used for pH measurements. Electrodes 23 and 24 are preferably formed of platinum, for example sheets of platinum one centimeter square and attached respectively to platinum wires sealed into glass supporting tubes as at 25. As shown in Fig. 4, all of the electrodes may be supported upon glass rods with connection wires running therethrough, these glass rods being held in the desired spaced relation by an apertured rubber stopper 26 fitted within the tube extension 10'.

A vent tube 27 of suitable plastic material also extends down through the stopper 26 and its lower end is held in place thereby, this tube affording means for preventing entrapment of air in the electrode chamber, and also providing a passage through which water may be introduced to flush the electrode chamber after each use of the device. From the lead wires within each of the glass supporting rods for the electrodes, connections as at 28 may run up through and out of the top of tube 10, these being adapted for connection to suitable potentiometer equipment such for example as a Beckman pH meter. The connection for the glass electrode 22 is preferably suitably shielded.

In operating the device a small hole may first preferably be made in the earth or the earth may be loosened as by the use of an iron bar and to a depth, say, from two to three and one-half feet, depending upon the depth at which the soil is to be tested. On removal of the iron bar the device shown in the drawings may then be pushed into the hole or loosened earth, the outer tube 12 meanwhile being in an angular position such as to keep the window 16 closed, to prevent soil from entering the electrode chamber until after the device is in place. Then the upper end of the outer tube may be grasped to turn the same to the position shown in Fig. 1, whereby the window openings 16, 16' coincide. The device is generally used in wet or waterlogged soils so that as soon as the window 16 is open, soil will flow in and around the electrodes, completing circuits therebetween so that potential differences between the electrodes may be measured by the potentiometer apparatus located above the surface of the ground. If desired, particularly if the device is used in soils which will not readily flow into the electrode cavity, the device may be rotated back and forth several times after it is in place with the window open, so that the soil will pass into and around the electrodes.

The potential measurements may now be made to determine the pH and $E_h$ values for the soil in the electrode cavity. In making the pH measurements the leads from the glass electrode 22 and the calomel half cell 21 are used. For the $E_h$ potentials, the leads from the calomel half cell 21 and one of the platinum electrodes 23 or 24 are used. Several measurements in succession may be made, using the calomel electrode and the platinum electrodes alternately until stable $E_h$ readings are obtained which agree closely.

The potentiometer equipment used may be so calibrated as to give readings directly in terms of pH values when connections are made to electrodes 21 and 22. If the pH reading is outside the range of about 5.5 to 8.5, then it will be known that the soil being tested is not conducive to the growth of anaerobic bacteria. On the other hand, if the pH reading is within this range, then the $E_h$ value has to be determined. Assuming for example that a reading of 100 millivolts is obtained between electrode 21 and electrode 23 and/or 24, this value has first to be corrected for a predetermined pH. This may be done by known procedure, but for the usual case and for convenience it may be assumed that for each change of the pH by one unit, the $E_h$ reading should be corrected by 60 millivolts. That is, assuming that at the time of taking said 100 millivolt reading, the soil being tested has a pH of 6, then 60 millivolts is subtracted from the reading of 100 millivolts, giving a difference of 40 millivolts. Since this reading is obtained with a saturated KCl type half cell, and since $E_h$ values are conventionally referred to in terms of values obtained with a hydrogen electrode, a further correction is made representing the difference in potential as measured, on account of the use of the saturated KCl electrode in lieu of the hydrogen electrode. For temperatures in the general neighborhood of 25° C., this difference amounts to about 246 millivolts, which, added to the above noted 40 millivolt value, gives a value of 286 millivolts as the hydrogen electrode $E_h$ value at a pH of 7.

It has by experience been found that if the $E_h$ value thus obtained is within the ranges indicated below, the aerobic or anaerobic conditions will be as noted—

400 m. v.—aerobic
200–400 m. v.—slightly anaerobic
100–200 m. v.—moderately anaerobic
100 m. v.—severely anaerobic In the particular example above given, where the corrected $E_h$ reading was 286 millivolts, it will be apparent that slightly anaerobic conditions are indicated.

In those cases where the oxidation-reduction potential was minus 200 to minus 250 millivolts, or lower, conditions were found to be relatively noncorrosive. This may have been due to the presence of hydrogen in the soil or on the metallic pipe surface. Under such conditions the extremely low oxidation-reduction potential would seem to indicate a noncorrosive environment due to hydrogen polarization.

Only a few minutes are required to complete the measurements at one site and to clean the electrodes as hereinafter explained, ready for the next use of the device at another site.

After the instrument has been withdrawn from the hole, the outer tube 12 with its pointed end may be slid off and water may be poured down the vent tube 27 to then wash out loose soil from the electrode cavity. The electrodes should then be carefully cleaned before the device is reused. For this purpose various detergents and washing liquids may be used. Satisfactory results have been obtained by the following washing procedure. The electrodes are first thoroughly washed with water to remove soil and other adhering material. They are then moved about for one-half to one minute in a cleaning solution consisting of 5% detergent in 5% acetic acid. A preferred detergent comprises Nacconol NRSF which is an alkyl aryl sulfonate containing sodium sulfate. Thereafter the electrodes are washed again with distilled water, then swirled about in a 10% solution of hydrogen peroxide for one-half to one minute. Finally they are rinsed in distilled water. This cleaning operation if desired may be accomplished without further dismantling the instrument, that is, the electrodes may be washed in solutions contained in a small vial introduced through the bottom end of the inner tube after removal of the outer tube.

By means of this instrument the electrodes may be placed in contact with the soil to be tested at the desired depth and the measurements completed without resorting to soil sampling. Thus it is possible to measure the potentials without appreciably disturbing the soil. Furthermore, there is no opportunity for air to diffuse into the soil and to alter the conditions therein before the measurements are made.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claim to cover all such changes and modifications.

What is claimed as new and desired to be secured by Letters Patent is:

In apparatus for testing wet sub-surface soils to determine the pH and $E_h$ values thereof, an elongated tube normally closed at one end which is substantially pointed so as to be adapted to be pushed into the earth to the depth at which the soil is to be tested, an assembly of electrodes mounted within said tube adjacent said end, one of said electrodes being of a reference half cell type, a second being of a pH responsive type and a third being formed of platinum, connections to said electrodes running up through the tube for connection of said first and second electrodes and said first and third electrodes to potential measuring apparatus to obtain readings indicative respectively of the pH and $E_h$ values of the soil, said tube being formed with a lateral opening adjacent said end for admitting earth therein to surround said electrodes, and closure means for said opening comprising a tube surrounding said first mentioned tube and being formed with an aperture adjacent said opening, and also being rotatable from its upper end to permit bringing its aperture into register with said opening after the device has been pushed into the earth, whereby the soil may then enter and surround said electrodes, said tubes at least at the portions thereof adjacent said electrodes being formed of insulation material.

ROBERT L. STARKEY.
KENT M. WIGHT.

REFERENCES CITED

The following references are of record in the file of this patent:

UNITED STATES PATENTS

| Number | Name | Date |
| --- | --- | --- |
| 902,049 | Bonnell | Oct. 27, 1908 |
| 1,910,021 | Legg | May 23, 1933 |

OTHER REFERENCES

"Soil Science,' vol. 37 (1934), pages 65 through 74.

"Gas Age," Dec. 2, 1943, page 29.